US012009167B2

(12) United States Patent
Loeffelbein et al.

(10) Patent No.: US 12,009,167 B2
(45) Date of Patent: Jun. 11, 2024

(54) CONTACTOR WITH INTEGRATED PYROTECHNIC INTERRUPTER

(71) Applicant: Littelfuse, Inc., Chicago, IL (US)

(72) Inventors: Sven Loeffelbein, Chicago, IL (US); Geoff Schwartz, Stoughton, MA (US)

(73) Assignee: Littelfuse, Inc., Chicago, IL (US)

( * ) Notice: Subject to any disclaimer, the term of this patent is extended or adjusted under 35 U.S.C. 154(b) by 142 days.

(21) Appl. No.: 17/933,695

(22) Filed: Sep. 20, 2022

(65) Prior Publication Data

US 2024/0096578 A1 Mar. 21, 2024

(51) Int. Cl.
*H01H 39/00* (2006.01)

(52) U.S. Cl.
CPC ..... *H01H 39/006* (2013.01); *H01H 2039/008* (2013.01)

(58) Field of Classification Search
CPC ........... H01H 39/006; H01H 2039/008; H01H 39/00; H01H 50/54; H01H 71/02; H01H 33/18
USPC ........................................................ 200/61.08
See application file for complete search history.

(56) References Cited

U.S. PATENT DOCUMENTS 10,566,160 B2 * 2/2020 McTigue ............... H01H 71/40
11,276,535 B2 * 3/2022 McTigue ............... H01H 39/00
2010/0126454 A1 5/2010 Heusel
2021/0142969 A1 5/2021 Bush
2022/0181108 A1 6/2022 Meissner

FOREIGN PATENT DOCUMENTS

WO 9742641 A1 11/1997
WO 2010061576 A1 6/2010

OTHER PUBLICATIONS

European Search Report for EP Application No. 23197756.2, dated Feb. 16, 2024, 11 pages.

* cited by examiner

*Primary Examiner* — Lheiren Mae A Caroc
(74) *Attorney, Agent, or Firm* — KDW FIRM PLLC

(57) ABSTRACT

An electrical contactor including a contactor assembly including a housing, an electromagnet coil and an electrically conductive core disposed within the housing, the core being movable relative to the coil under influence of an electromagnetic force produced by the coil, and an electrically conductive bridge connected to a lower end of the core and movable with the core, an interrupter assembly including a base located below the bridge and having a trench formed in a top surface thereof, an input bus bar and an output bus bar disposed on the base on opposing sides of the trench, and a pyrotechnic interrupter disposed within the trench. The pyrotechnic interrupter may include a plunger and pyrotechnic ignitor disposed below the plunger, wherein, when the pyrotechnic ignitor is actuated, the plunger forcibly drives the bridge away from the input bus bar and an output bus bar to break an electrical connection therebetween.

20 Claims, 3 Drawing Sheets

CONTACTOR WITH INTEGRATED PYROTECHNIC INTERRUPTER

FIELD OF THE DISCLOSURE

The present disclosure relates generally to the field of circuit protection devices and relates more particularly to a high voltage contactor with an integrated pyrotechnic interrupter.

FIELD OF THE DISCLOSURE

A contactor is an electrically controlled switch used for switching an electrical power circuit, such as in an electric vehicle. In a typical configuration, a contactor includes an electromagnet coil and a movable, electrically conductive core disposed within or adjacent the coil. The core is attached to an electrically conductive bridge. When the coil is energized, it produces an electromagnetic field that shifts the core such that the bridge is moved into engagement with a pair of stationary contacts. The bridge provides an electrically conductive pathway between the contacts and allows current to flow through the contactor (e.g., from an automobile a battery to various electrical systems within an automobile). When the coil is deenergized, the bridge moves away from the stationary contacts and the electrical pathway is broken, thereby arresting the flow of current through the contactor.

In some instances, it may be desirable or necessary to open a contactor more quickly than can be achieved by deenergizing the contactor (e.g., in the case of an extreme overcurrent condition). It may also be desirable to open a contactor in a manner that ensures that the contactor cannot again be closed (e.g., in the case of an automobile accident).

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An electrical contactor in accordance with an exemplary embodiment of the present disclosure may include a contactor assembly including a housing, an electromagnet coil and an electrically conductive core disposed within the housing, the electrically conductive core being movable relative to the electromagnet coil under influence of an electromagnetic force produced by the electromagnet coil, and an electrically conductive bridge connected to a lower end of the electrically conductive core and movable with the electrically conductive core. The electrical contactor may further include an interrupter assembly including an electrically insulating base located below the electrically conductive bridge and having a trench formed in a top surface thereof, an input bus bar and an output bus bar disposed on top of the base on opposing sides of the trench, and a pyrotechnic interrupter disposed within the trench. The pyrotechnic interrupter may include a plunger and pyrotechnic ignitor disposed below the plunger, wherein the electrically conductive bridge is movable between a first position, wherein the electrically conductive bridge provides an electrical connection between the input bus bar and the output bus bar, and a second position, wherein the electrically conductive bridge does not provide an electrical connection between the input bus bar and the output bus bar, and wherein, when the pyrotechnic ignitor is actuated, the plunger forcibly drives the electrically conductive bridge from the first position toward the second position.

An exemplary embodiment of a method of operating the electrical contactor of the present disclosure may include increasing a duty cycle of electrical power supplied to the electromagnet coil if current flowing through the input bus bar and the output bus bar rises above a predetermined maximum value, deenergizing the electromagnet coil if current flowing through the input bus bar and the output bus bar continues rising above the predetermined maximum value and a rate of rise of the current falls within a first range, and actuating the pyrotechnic ignitor if current flowing through the input bus bar and the output bus bar continues rising above the predetermined maximum value and the rate of rise of the current falls within a second range greater than the first range, whereby the plunger forcibly drives the electrically conductive bridge from the first position toward the second position.

DETAILED DESCRIPTION

Figure 1:
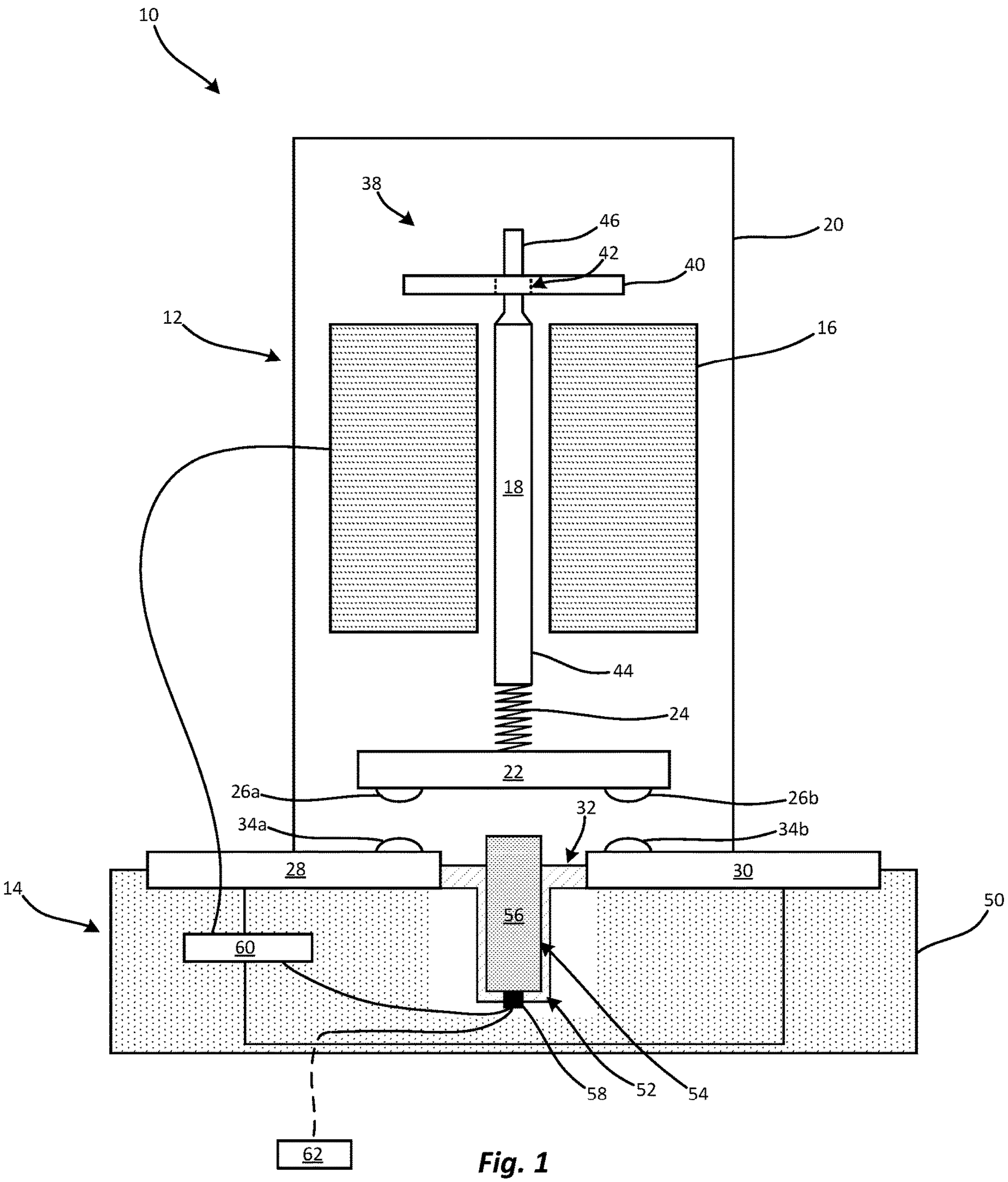
FIG. 1 is a cross-sectional view illustrating a contactor in accordance with an exemplary embodiment of the present disclosure.

Embodiments of a contactor and a method of operating the same in accordance with the present disclosure will now be described more fully with reference to the accompanying drawings, in which preferred embodiments of the present disclosure are presented. The contactor and the associated method of the present disclosure may, however, be embodied in many different forms and should not be construed as being limited to the embodiments set forth herein. Rather, these embodiments are provided so that this disclosure will be thorough and complete, and will convey certain exemplary aspects of the contactor and the associated method to those skilled in the art. In the drawings, like numbers refer to like elements throughout unless otherwise noted.

Referring to FIG. 1, a schematic, cross-sectional view illustrating an electrical contactor with an integrated pyrotechnic interrupter 10 (hereinafter "the contactor 10") in accordance with an exemplary embodiment of the present disclosure is shown. For the sake of convenience and clarity, terms such as "top," "bottom," "up," "down," "upper," "lower," "vertical," and "horizontal" may be used herein to describe the relative positions and orientations of various components of the contactor 10, all with respect to the geometry and orientation of the contactor 10 as it appears in FIG. 1. Said terminology will include the words specifically mentioned, derivatives thereof, and words of similar import.

The contactor 10 may generally include a contactor assembly 12 and an interrupter assembly 14. The contactor assembly 12 may include an electromagnet coil 16 and an electrically conductive core 18 disposed within a housing 20. The housing 20 may be formed of an electrically insulating material, including, but not limited to, ceramic, glass, plastic, etc. The core 18 may extend longitudinally through the coil 16 and may be axially movable relative to the coil 16. In various alternative embodiments the core 18 may be partially or entirely disposed below the coil 16. The present disclosure is not limited in this regard. A lower end of the core 18 may protrude from the coil 16 and may be connected to an electrically conductive contact bridge 22 by a contact spring 24. The conductive contact bridge 22 may be elongated in a direction generally perpendicular to an axis along which the core 18 is movable. Electrically conductive first and second movable contacts 26*a*, 26*b* may be disposed on an underside of the contact bridge 22 adjacent opposing longitudinal ends of the contact bridge 22.

The contactor assembly 12 may further include an electrically conductive input bus bar 28 and an electrically conductive output bus bar 30 disposed on an underside of the housing 20 below the contact bridge 22. The input bus bar 28 and the output bus bar 30 may be generally coplanar and horizontally spaced apart from one another to define a gap 32 therebetween. The gap 32 may be located horizontally intermediate the first and second movable contacts 26*a*, 26*b*. Electrically conductive first and second stationary contacts 34*a*, 34*b* may be disposed on the top surfaces of the input bus bar 28 and the output bus bar 30, respectively, and may be located directly below the first and second movable contacts 26*a*, 26*b*, respectively.

Figure 3:
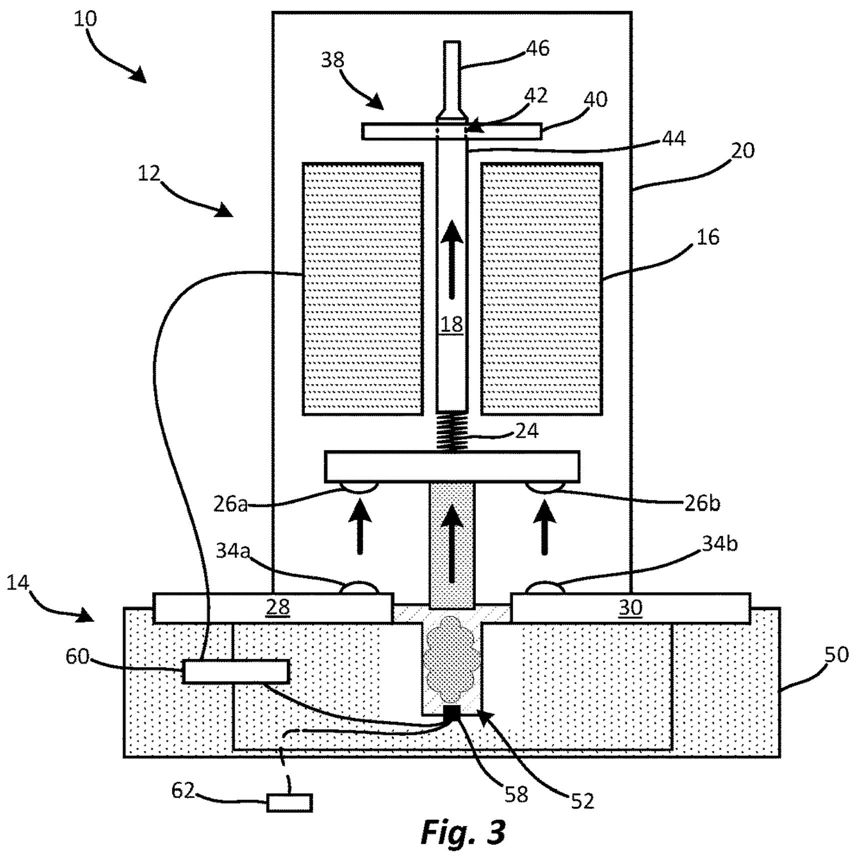
FIG. 3 is a cross-sectional view illustrating the contactor shown in FIG. 1 with a pyrotechnic initiator of the contactor in an actuated state.

The contactor assembly 12 may further include a locking mechanism 38 disposed above the coil 16 and adapted to retain the core 18 if the core 18 is forced upwardly beyond its normal range of motion (as shown in FIG. 3 and as described in greater detail below). The locking mechanism 38 may include a resilient cuff, bearing, or bushing 40 (hereinafter "the bushing 40") having a central aperture 42 having a diameter d1. The core 18 may have a main axial portion 44 having a diameter d2 larger than the diameter d1 and may terminate in a tip portion 46 having a diameter d3 smaller than the diameter d1. During normal operation of the contactor assembly 12, the main axial portion 44 may be located below the bushing 40 and the tip portion 46 may extend axially through the central aperture 42 shown in FIG. 1.

The bushing 40 may be formed of a soft or resilient material such as plastic (e.g., nylon), rubber, etc. The present disclosure is not limited in this regarded. If the core 18 is forced upwardly beyond its normal range of motion, the main axial portion 44 of the core 18 will move into the central aperture 42 and will be securely held therein via interference fit with the bushing 40 (as shown in FIG. 3). The core 18 is thereafter retained by the bushing 40 and is prevented from moving downwardly. It will be appreciated by those of ordinary skill in the art that the bushing 40 is merely one example of a locking mechanism that can be used to retain the core 18 and that numerous alternative arrangements that include various types of catches, latches, detents, locks, etc. can be implemented for retaining the core 18 in a similar manner. The present disclosure is not limited in this regard.

The interrupter assembly 14 of the contactor 10 may include an electrically insulating base 50 fastened to undersides of the input bus bar 28 and the output bus bar 30 (e.g., via mechanical fasteners, not shown). The base 50 may be formed of an electrically insulating and heat/fire resistant material, including, but not limited to, ceramic, glass, various composites, etc. The base 50 may have a trench 52 formed in a top surface thereof directly below the gap 32. A pyrotechnic interrupter 54 may be disposed within the trench 52 may include a movable piston or plunger 56 (hereinafter "the plunger 56) and a pyrotechnic ignitor 58 located below the plunger 56. The plunger 56 may be formed of a dielectric material, including, but not limited to, plastic, rubber, various composites, etc.

The contactor 10 of the present disclosure may further include a contactor controller 60 that is electrically/operatively coupled to the input bus bar 28, the output bus bar 30, the pyrotechnic ignitor 58, and the coil 16 (or to a power supply that feeds the coil 16). The contactor controller 60 may be, or may include, a control device such as a microcontroller, an application specific integrated circuit (ASIC), or other similar control device. The present disclosure is not limited in this regard. The contactor controller 60 is shown as being located within the interrupter assembly 14 but this is not critical. The contactor controller 60 may alternatively be located within the contactor assembly 12 or external to the interrupter assembly 14 and the contactor assembly 12 for example. The contactor controller 60 may be adapted to monitor electrical current flowing through the input bus bar 28 and the output bus bar 30 and, based on the monitored current, to energize/deenergize the coil 16 and/or to actuate the pyrotechnic ignitor 58 as further described below.

Figure 4:
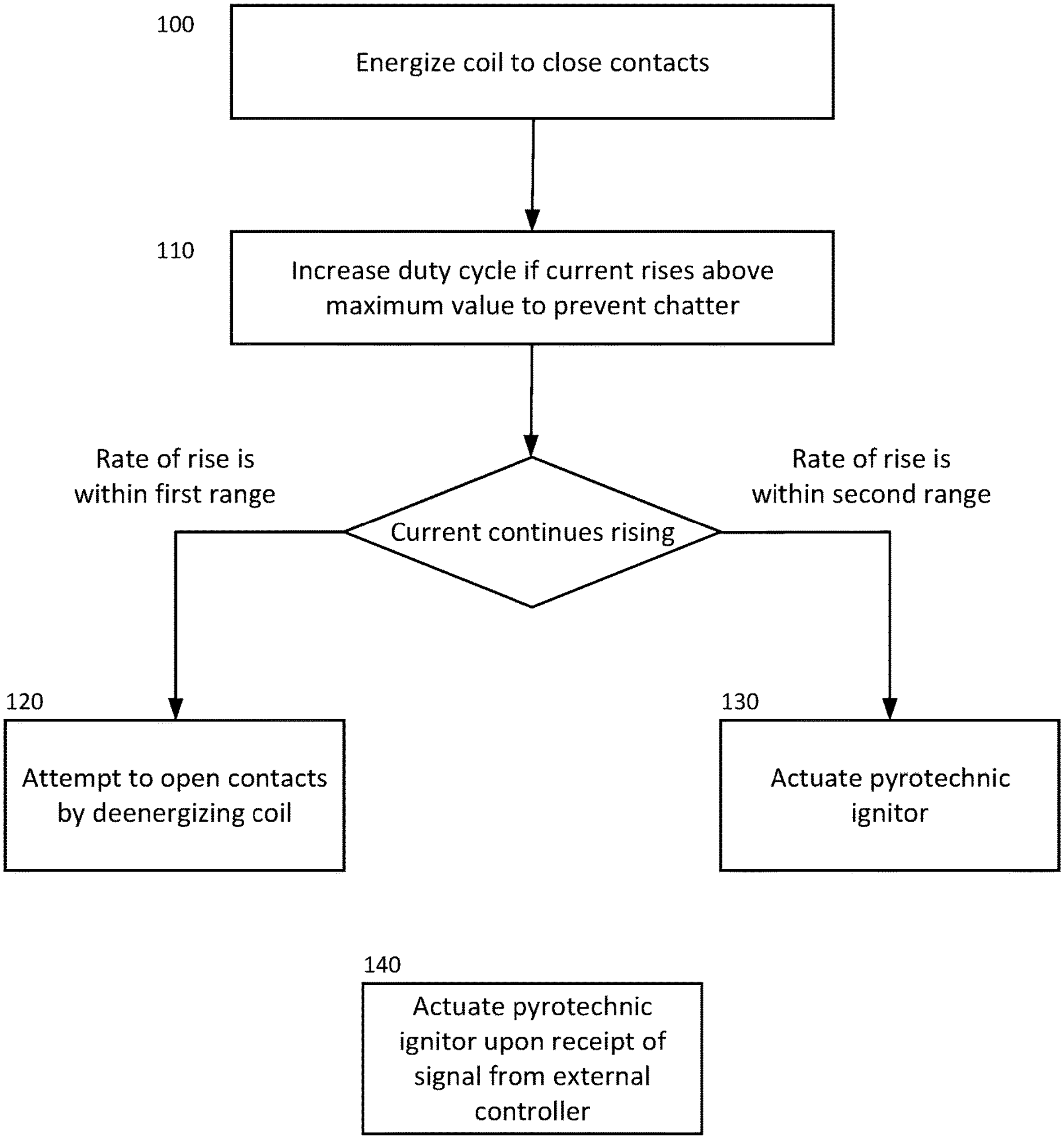
FIG. 4 is a flow diagram illustrating a method of operating the contactor shown in FIG. 1 in accordance with an exemplary embodiment of the present disclosure.

Referring to FIG. 4, a flow diagram illustrating an exemplary method of operating the contactor 10 in accordance with the present disclosure is shown. The method will now be described in conjunction with the illustrations of the contactor 10 shown in FIGS. 1-3.

Figure 2:
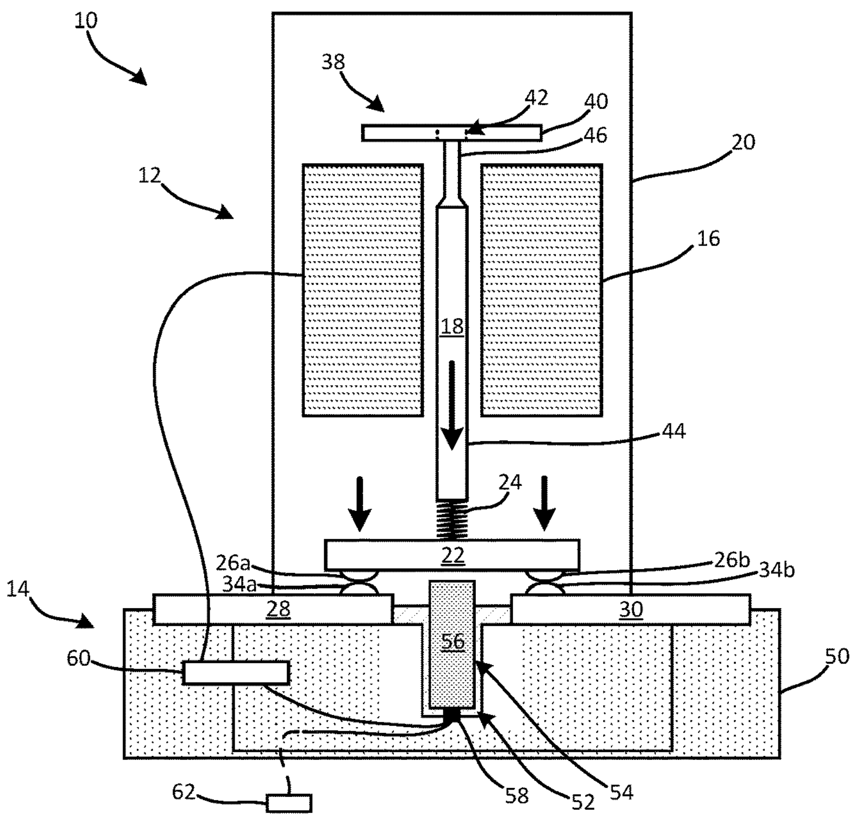
FIG. 2 is a cross-sectional view illustrating the contactor shown in FIG. 1 in a closed state.

At block 100 of the exemplary method shown in FIG. 4, the contactor 10 may be normally operated by energizing the coil 16 (e.g., under command of the contactor controller 60 or a different controller external to the contactor 10) to produce an electromagnetic force that pushes the core 18 and the attached contact bridge 22 downwardly, from an open position shown in FIG. 1 to a closed position shown in FIG. 2. The first and second movable contacts 26*a*, 26*b* are thereby brought into contact with the first and second stationary contacts 34*a*, 34*b*, respectively, thus establishing an electrical pathway from the input bus bar 28, through the contact bridge 22, to the output bus bar 30. The contact spring 24 is compressed when the core 18 and the contact bridge 22 are moved into the closed position and holds the first and second movable contacts 26*a*, 26*b* in firm engagement with the first and second stationary contacts 34*a*, 34*b* to maintain a good electrical connection therebetween. Electrical current is thus allowed to flow through the contactor 10 from a source of electrical power (e.g., an automobile battery) to one or more electrical loads (e.g., one or more electrical systems within an automobile).

At block 110 of the method, if the contactor controller 60 determines that electrical current flowing through the contactor 10 has risen above a predetermined maximum value, the contactor controller 60 may increase the duty cycle of electrical power supplied to the coil 16 to strengthen the downwardly directed, electromagnetic force acting on the core 18. This may counteract levitative electromagnetic forces that may be produced by the increased current in the input bus bar 28 and output bus bar 30 and may securely hold the contact bridge 22 and the first and second movable contacts 26*a*, 26*b* in the closed position to prevent "chattering" (rapid opening and closing of the contacts) that could otherwise damage the contactor 10.

At block 120 of the exemplary method, if the contactor controller 60 determines that electrical current flowing through the contactor 10 continues to rise (i.e., beyond the level measured in block 110), and that the rate of rise falls within a first range (e.g., less than 1 kA/second), the contactor controller 60 may attempt to open the first and second movable contacts 26*a*, 26*b* by deenergizing the coil 16. Thus, the downwardly directed electromagnetic force acting on the core 18 is removed, and a retaining spring (not shown) within the contactor assembly 12 may push the core 18 and the contact bridge 22 back to the open position. Electrical current flowing through the contactor 10 is thereby arrested and electrical components connected to the contactor 10 are protected from the overcurrent condition.

At block 130 of the exemplary method, if the contactor controller 60 determines that electrical current flowing through the contactor 10 continues to rise (i.e., beyond the level measured in block 110), and that the rate of rise falls within a second range greater than the first range (e.g., greater than 1 kA/second), it may be necessary to open the first and second movable contacts 26*a*, 26*b* faster than can be achieved by deenergizing the coil 16 in order to prevent or mitigate damage to connected electrical components. In such a circumstance, the contactor controller 60 may send an actuation signal to the pyrotechnic ignitor 58, causing the pyrotechnic ignitor 58 to be detonated as shown in FIG. 3. A resultant increase in pressure within the trench 52 may force the plunger 56 upwardly, into engagement with the contact bridge 22, driving the contact bridge 22 and the core 18 upwardly. The core 18 may be forced upwardly beyond its normal open position (shown in FIG. 1), driving the main axial portion 44 of the core 18 into the central aperture 42 of the bushing 40 of the locking mechanism 38. Thus, electrical current flowing through the contactor 10 is arrested and the core 18 is securely retained by the locking mechanism 38 to ensure that the first and second movable contacts 26*a*, 26*b* cannot be moved back to the closed position. Electrical components connected to the contactor 10 are thereby protected from dangerously high levels of current that could otherwise flow through the contactor 10.

It has been found through experimentation that the pyrotechnic interrupter 54 can open the first and second movable contacts 26*a*, 26*b* and arrest current in the contactor 10 in less than 2 ms. By contrast, opening the first and second movable contacts 26*a*, 26*b* by simply deenergizing the coil 16 (as in conventional contactors) can take 20 ms or more. The pyrotechnic interrupter 54 therefore provides an effective solution for arresting current in the contactor 10 in an expedient manner.

In some cases, it may be desirable to actuate the pyrotechnic interrupter 54 and rapidly open the contactor 10 regardless of the amount of current flowing through the contactor 10. For example, it may be desirable to rapidly arrest current in an automobile's electrical systems in the case of a collision to prevent or mitigate fire/explosion. To that end, the pyrotechnic ignitor 58 may be coupled to one or more external controllers 62, such as an airbag control unit of an automobile, a battery management system of an automobile, etc., that may be configured to detect a predefined event such as an automobile collision. Upon the detection of a such an event, the external controller 62 may, at block 140 of the exemplary method, send an actuation signal to the pyrotechnic ignitor 58 to forcibly open the contactor 10 in the manner described above.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An electrical contactor comprising:
a contactor assembly comprising:
a housing;
an electromagnet coil and an electrically conductive core disposed within the housing, the electrically conductive core being movable relative to the electromagnet coil under influence of an electromagnetic force produced by the electromagnet coil; and
an electrically conductive contact bridge connected to a lower end of the electrically conductive core and movable with the electrically conductive core; and
an interrupter assembly comprising:
an electrically insulating base located below the electrically conductive bridge and having a trench formed in a top surface thereof;
an input bus bar and an output bus bar disposed on top of the electrically insulating base on opposing sides of the trench; and
a pyrotechnic interrupter disposed within the trench and comprising:
a plunger; and
a pyrotechnic ignitor disposed below the plunger;
wherein the electrically conductive contact bridge is movable between a first position, wherein the electrically conductive contact bridge provides an electrical connection between the input bus bar and the output bus bar, and a second position, wherein the electrically conductive contact bridge does not provide an electrical connection between the input bus bar and the output bus bar, and wherein, when the pyrotechnic ignitor is actuated, the plunger forcibly drives the electrically conductive contact bridge from the first position toward the second position.

2. The electrical contactor of claim 1, further comprising:
electrically conductive first and second movable contacts disposed on an underside of the electrically conductive contact bridge adjacent opposing longitudinal ends of the electrically conductive contact bridge; and
electrically conductive first and second stationary contacts disposed on top surfaces of the input bus bar and the output bus bar, respectively;
wherein the electrically conductive first and second movable contacts are movable into and out of contact with the electrically conductive first and second stationary contacts, respectively.

3. The electrical contactor of claim 1, wherein the electrically conductive contact bridge is connected to the electrically conductive core by a contact spring, wherein the contact spring is held in compression when the electrically conductive contact bridge is in the first position.

4. The electrical contactor of claim 1, further comprising a contactor controller connected to the input bus bar and the output bus bar and adapted to monitor electrical current flowing through the input bus bar and the output bus bar.

5. The electrical contactor of claim 4, wherein the contactor controller is configured to increase a duty cycle of electrical power supplied to the electromagnet coil if current flowing through the input bus bar and the output bus bar rises above a predetermined maximum value.

6. The electrical contactor of claim 5, wherein the contactor controller is configured to deenergize the electromagnet coil if current flowing through the input bus bar and the output bus bar continues rising above the predetermined maximum value and a rate of rise of the current falls within a first range.

7. The electrical contactor of claim 6, wherein the first range is less than 1 kA/second.

8. The electrical contactor of claim 6, wherein the contactor controller is configured to actuate the pyrotechnic ignitor if current flowing through the input bus bar and the output bus bar continues rising above the predetermined maximum value and the rate of rise of the current falls within a second range greater than the first range.

9. The electrical contactor of claim 8, wherein the second range is greater than 1 kA/second.

10. The electrical contactor of claim 1, further comprising a locking mechanism located above the electrically conductive core, the locking mechanism comprising a resilient bushing defining a central aperture having a diameter d1, the electrically conductive core having a diameter d2 larger than the diameter d1, wherein when the electrically conductive core is forced upwardly beyond a normal range of motion the electrically conductive core will move into the central aperture and will be securely held therein via interference fit with the bushing.

11. The electrical contactor of claim 10, wherein the electrically conductive core has a tip portion having a diameter d3 smaller than the diameter d1, wherein during normal operation of the electrical contactor the tip portion extends axially through the central aperture.

12. A method of operating an electrical contactor, the electrical contactor including:

a contactor assembly including:

a housing;

an electromagnet coil and an electrically conductive core disposed within the housing, the electrically conductive core being movable relative to the electromagnet coil under influence of an electromagnetic force produced by the electromagnet coil; and an electrically conductive contact bridge connected to a lower end of the electrically conductive core and movable with the electrically conductive core; and an interrupter assembly including:

an electrically insulating base located below the electrically conductive contact bridge and having a trench formed in a top surface thereof;

an input bus bar and an output bus bar disposed on top of the electrically insulating base on opposing sides of the trench; and a pyrotechnic interrupter disposed within the trench and including:

a plunger; and a pyrotechnic ignitor disposed below the plunger;

wherein the electrically conductive contact bridge is movable between a first position, wherein the electrically conductive contact bridge provides an electrical connection between the input bus bar and the output bus bar, and a second position, wherein the electrically conductive contact bridge does not provide an electrical connection between the input bus bar and the output bus bar;

the method comprising increasing a duty cycle of electrical power supplied to the electromagnet coil if current flowing through the input bus bar and the output bus bar rises above a predetermined maximum value.

13. The method of claim 12, further comprising deenergizing the electromagnet coil if current flowing through the input bus bar and the output bus bar continues rising above the predetermined maximum value and a rate of rise of the current falls within a first range.

14. The method of claim 13, wherein the first range is less than 1 kA/second.

15. The method of claim 13, further comprising actuating the pyrotechnic ignitor if current flowing through the input bus bar and the output bus bar continues rising above the predetermined maximum value and the rate of rise of the current falls within a second range greater than the first range, whereby the plunger forcibly drives the electrically conductive contact bridge from the first position toward the second position.

16. The method of claim 15, wherein the second range is greater than 1 kA/second.

17. The method of claim 15, wherein the plunger forcibly drives the electrically conductive contact bridge beyond the second position and the electrically conductive core is secured by a locking mechanism that prevents the electrically conductive contact bridge from moving to the first position.

18. The method of claim 17, wherein the locking mechanism comprising a resilient bushing defining a central aperture having a diameter d1, the electrically conductive core having a diameter d2 larger than the diameter d1, wherein when the electrically conductive core is forced upwardly beyond a normal range of motion the electrically conductive core will move into the central aperture and will be securely held therein via interference fit with the bushing.

19. The method of claim 18, wherein the electrically conductive core has a tip portion having a diameter d3 smaller than the diameter d1, wherein during normal operation of the electrical contactor the tip portion extends axially through the central aperture.

20. The method of claim 12, further comprising an external controller actuating the pyrotechnic ignitor regardless of an amount of electrical current flowing through the input bus bar and the output bus bar.

* * * * *